United States Patent Office 2,847,342
Patented Aug. 12, 1958

2,847,342

ETHOXYLINE RESIN COMPOSITIONS AND THEIR PREPARATION

Leo S. Kohn, Schenectady, N. Y., assignor to General Electric Company, a corporation of New York No Drawing. Application March 7, 1957
Serial No. 644,482

4 Claims. (Cl. 154—140)

This invention relates to new and useful resin compositions. More particularly, the invention relates to resin compositions having desirable physical, chemical and electrical properties, including long pot life and flexibility at room temperature or elevated temperatures, or both.

Epoxy, epoxide or ethoxyline resins, as they are variously called, are well known in the art. Generally, such epoxy resins comprise a polyether derivative of a polyhydric organic compound, said derivative containing 1, 2 epoxy groups, said compound being selected from the class consisting of polyhydric alcohols and phenols containing at least two phenolic hydroxy groups. For example, U. S. Patent 2,324,483 to Castan discloses epoxy resin compositions comprising the reaction product of phenols having at least two phenolic hydroxy groups and an epihalogenohydrin such as epichlorohydrin, the product having at least two epoxy groups and being cured to a thermoset, infusible mass by the use of a carboxylic or polybasic acid or acid anhydride, such as phthalic anhydride. The use of organic nitrogen base or amine type materials to cure epoxy resins is also well known as set forth, for example, in Patent 2,444,333, such materials often giving a rapid cure at room temperature. Generally, however, the pot life of amine cured epoxy resins is comparatively short and their high temperature characteristics are often poor.

While in many applications the hard and rather brittle epoxy resinous compositions which are normally attained with polybasic acid or anhydride or amine type cured are useful, it is sometimes desirable that a resin used as an adhesive, filler, coating and the like, in conjunction with other structures, such as wires, laminates, etc., which expand or move either at room temperature or at elevated temperatures, be rubbery or flexible at such temperatures to prevent the disruptive forces from tearing the structure apart. Thus, in the stator coils of electrodynamic machines, the conductor bars of which are insulated with a resinous material, it is desirable that at high operating temperatures of the order of 80° C. and above, the insulating resin be rubbery and flexible so that it will conform to the expansion and warping of the conducting bars. By this is not meant simply heat distortion of the resin which is permanent, but an ability to yield under high temperature produced stresses and to substantially recover therefrom upon the release of the stress when the temperature is lowered, and returned to a hardened state. In other instances, it is desirable that the resinous material forming part of a structure be flexible or rubbery both at room temperature and at elevated temperatures.

A principal object of the invention is to provide new epoxy resin compositions which have desirable physical, chemical and electrical characteristics including long pot life and stability and which are obtainable either as hard or rubbery and flexible materials at ordinary temperatures or elevated temperatures or both.

Briefly, the invention comprises epoxy resin compositions having as the curing agent an organic nitrogen containing base such as an amine and a lactam or mixture of lactams. By using certain proportions of the organic nitrogen containing base and lactam, cured resin compositions having varied, desirable characteristics can be obtained. In some cases the compositions are hard both at ordinary and at elevated temperatures. Using other proportions of curing agents, the resulting compositions are hard at ordinary temperatures but flexible and rubbery and tough at elevated temperatures. In still other cases the cured materials are flexible or soft at ordinary temperatures. There are provided, then, new epoxy resin compositions having a variety of physical characteristics depending upon the amount and combination of curing agent used. Generally speaking for each 100 parts by weight of epoxy resin, there are employed from 5 to 40 parts by weight of lactam and from 6 parts by weight up to the stoichiometric amount of organic nitrogen base material or in such amount that substantially all epoxy groups of the epoxy resin are reacted.

The ethoxyline resins used in conjunction with my invention are, as pointed out above, well known in the art. They are described in Castan United States Patent Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2-propane. United States Patent Nos. 2,494,295; 2,500,600 and 2,511,913 describe further ethoxyline resins which can be used in conjunction with my invention. The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

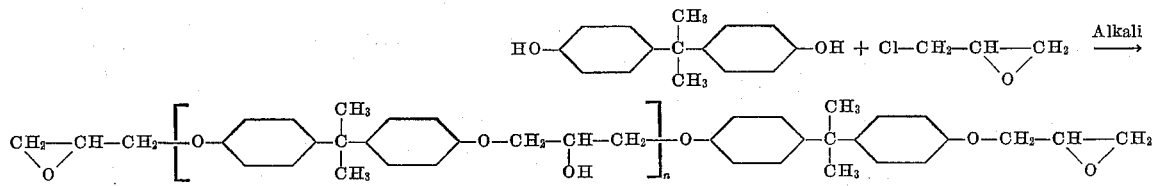

where $n$ has an average value ranging from 0 to about 7. Such ethoxyline resins are sold under the name of Epon by Shell Chemical Corporation under the name Araldite by the Ciba Company as Epi-Rez resins by Devoe-Raynolds Company and ERL resins by the Bakelite Company. The data given below for such resins is representative.

Table I

| Epoxy Resin | Epoxide Equivalent | M. P., 0° |
|---|---|---|
| Epon 828 | 192 | 9 |
| Epon 834 | 225–290 | 20–28 |
| Epon 1001 | 450–425 | 64–76 |
| Epon 1004 | 905–985 | 97–103 |
| Epon 1007 | 1,600–1,900 | 127–133 |
| Epon 1009 | 2,400–4,000 | 145–155 |
| Epon 1062 | 140–165 | Liquid |
| Epon 1064 | 300–375 | 40–45 |
| Araldite 6010 | 192 | Liquid |
| Araldite 6020 | 200–205 | Liquid |
| ERL 2774 | 175–200 | Liquid |
| Epi-Rez 510 | 175–200 | Liquid |

The lactams useful in connection with the invention include pyrrolidone, piperidone, and caprolactam, among others. In general, any compound having the well-known lactam group and no other constituent reactive with epoxy resins is useful. Thus, morpholone containing an oxygen atom in the ring is useful as are compounds containing a sulphur atom. Mixtures of lactams are also useful and the term "lactam" will be understood to include such mixtures. It has been found that a lactam material used alone is not an efficient curing agent for epoxy resins. When 15 parts by weight of ε-caprolactam were added to 100 parts by weight of Araldite 6020 and the mixture heated at 135° C. to 150° C., no appreciable curing action had taken place after more than 72 hours of such heating.

Typical nitrogen containing organic bases include among others amines, such as piperidine, pyrrolidine, triethanolamine, diethylenetriamine, dibutyl amine, tributyl amine, morpholine, trimethylamine, triethylenetetramine, diethylamine, guanidine, and its derivatives and derivatives of these amines as, for instance, piperidine benzoate, piperidine salt or pentamethylamine dithiocarbamic acid, the diethylamine salt of diethyldithiocarbamic acid and a combination of piperidine with benzaldehyde. The term "amine" or "organic base" as used herein will be understood to include also mixtures of amines or organic base.

When an organic nitrogen containing base curing agent such as tris-(dimethylaminomethyl) phenol hereafter known as DMP-30 and sold under such designation by Rohm and Haas Company in the usual proportion of 10 parts by weight per 100 parts by weight of Araldite 6010 with mixing at room temperature, the composition cured in about 45 minutes to a hard, brittle mass which was still hard and brittle at a temperature of 80° C. On the other hand, using the curing agents set forth in this application, compositions which are rubbery or flexible and tough or hard or soft at ordinary or high temperatures, or both, can be readily prepared. The lactam and organic nitrogen containing base can be combined with the epoxy resin in any desired sequence. Typically, the epoxy resin is heated to about 100° C. and the lactam, if solid, dissolved therein, cooled and then the organic nitrogen containing base is added thereto and disolved. No heating, of course, is necessary to dissolve liquid components.

The following examples are illustrative of the practice of the invention, all parts being by weight.

100 parts of Araldite 6010 were combined with varying amounts of 2-pyrrolidone as shown in Table I below and with 12 parts of triethanolamine first adding the 2-pyrrolidone and then adding the triethanolamine. The homogeneous mixture was cured for 20 hours at 100° C., the cured material having the following characteristics.

Table II

| Example | Parts 2-pyrrolidone | R. T. | 100° C. |
|---|---|---|---|
| 1 | 0 |  | Hard. |
| 2 | 5 |  | Hard. |
| 3 | 10 |  | Flexible and tough. |
| 4 | 15 |  | Soft. |

The above was repeated except that ε-caprolactam was used in lieu of 2-pyrrolidone with the results shown in Table III below. The epoxy resin was heated to dissolve the ε-caprolactam and cooled before the amine was added.

Table III

| Example | Parts ε-Caprolactam | R. T. | 100° C. |
|---|---|---|---|
| 5 | 0 |  | Hard. |
| 6 | 5 |  | Hard. |
| 7 | 10 |  | Flexible and tough. |
| 8 | 15 |  | Soft. |

Example 1 was repeated except that the organic nitrogen containing base consisted of 10 parts DMP-30 per 100 parts Araldite 6010 to which were added varying amounts of ε-caprolactam as shown in Table IV below.

Table IV

| Example | Parts ε-Caprolactam | R. T. | 100° C. |
|---|---|---|---|
| 9 | 0 | Hard | Hard. |
| 10 | 5 | do | Do. |
| 11 | 10 | Flexible | Tough. |
| 12 | 15 | Hard | Flexible and tough. |
| 13 | 20 | do | Soft. |
| 14 | 25 | do | Do. |
| 15 | 30 | Slightly flexible | Do. |
| 16 | 40 | Flexible and tough | Do. |
| 17 | 50 | Soft | Do. |

Examples shown in Table IV above were repeated except that the lactam used was 2-pyrrolidone in the amounts shown in Table V below.

Table V

| Example | Parts 2-pyrrolidone | 80° C. | 100° C. | 135° C. |
|---|---|---|---|---|
| 18 | 0 | Hard | Hard | Very slightly flexible. |
| 19 | 5 | do | do | Flexible and tough. |
| 20 | 7.5 | do | Slightly flexible. | Do. |
| 21 | 10 | do | Flexible and tough. | Soft. |
| 22 | 15 | Slightly flexible. | do | Do. |
| 23 | 20 | Flexible and tough. | Soft | Do. |
| 24 | 25 | Soft | do | Do. |

Example 1 was repeated except that the organic nitrogen containing base consisted of 6 parts by weight of piperidine per 100 parts by weight of Araldite 6010. Varying amounts of 2-pyrrolidone were used as shown in Table VI with the results set forth therein.

Table VI

| Example | Parts 2-pyrrolidone | 80° C. | 100° C. | 135° C. |
|---|---|---|---|---|
| 25 | 0 | Hard | Hard | Hard. |
| 26 | 5 | do | do | Very slightly flexible. |
| 27 | 10 | do | do | Flexible and tough. |
| 28 | 12.5 | do | Very slightly flexible. | Soft. |
| 29 | 15 | Slightly flexible. | Flexible and tough. | Do. |
| 30 | 20 | Flexible and tough. | Soft | Do. |
| 31 | 25 | Soft | do | Do. |

The examples set forth in Table VI were repeated except that the lactam used was ε-caprolactam in the amounts shown in Table VII below with the results shown therein.

Table VII

| Example | Parts ε-caprolactam | 80° C. | 100° C. | 135° C. |
|---|---|---|---|---|
| 32 | 0 | Hard | Hard | Hard. |
| 33 | 5 | do | do | Flexible and tough. |
| 34 | 10 | do | do | Soft. |
| 35 | 12.5 | do | Slightly flexible. | Do. |
| 36 | 15 | do | Flexible and tough. | Do. |
| 37 | 20 | Slightly flexible. | Soft | Do. |
| 38 | 25 | Flexible and tough. | do | Do. |

Example 1 was repeated except that for each 100 parts by weight of Araldite 6010, 6 parts by weight of piperidine as the organic nitrogen containing base and 10 parts by weight of 2-piperidone were used as the lactam. When this material was cured for 20 hours at 100° C. it was slightly flexible at 100° C., it was flexible and tough at 125° C. and relatively soft at 135° C.

When dumbbell shaped pieces of the resinous composition 6″ in length and 750 mils thick were tested according to a modified ASTM Test #D638–52T, the results shown in Table VIII below were obtained.

Table VIII

| | Tensile Modulus | Strain | Tensile Modulus | Strain |
|---|---|---|---|---|
| Example 11: 100 parts Araldite 6010, 10 parts DMP–30, 10 parts ε-caprolactam | 441,000 | 0.014 | 40,000 | 0.050 |
| Example 9: 100 parts Araldite 6010, 10 parts DMP–30 | 486,000 | 0.008 | 28,000 | 0.014 |
| Example 21: 100 parts Araldite 6010, 10 parts DMP–30, 10 parts 2-pyrrolidone | 465,000 | 0.010 | 80,000 | 0.050 |

From Table VIII above, it will at once be apparent that when the lactam material is combined with an organic nitrogen containing base as a composite curing agent for epoxy resins, the physical characteristics of the resulting compositions at room temperature and at elevated temperatures are radically altered. For example, whereas using as a curing agent DMP–30 alone, the resulting composition was hard and even brittle at both room temperature and at 100° C. when 10 parts of a lactam such as ε-caprolactam or 2-pyrrolidone were used, the resulting composition, while relatively hard at room temperature, was rubbery and flexible at a temperature of 100° C.

The epoxy resin compositions of this invention may be used as potting compounds and for molding purposes. When dissolved in suitable well known solvents, they can be used as impregnants for fibrous materials and as adhesives or binders for laminates and other structures. They can be used as coating materials or insulation for wires or electrical conductors which are required to have certain specific characteristics at particular temperatures. They can be filled with the usual fillers in varying amounts to give compositions tailored to suit any particular needs.

What I claim as new and desire to secure by Letters Patent of the United States is:

1. A composition of matter comprising the heat reaction product of (1) 100 parts by weight of a complex epoxide resin containing 1, 2 epoxide groups and comprising the polyether derivative of a polyhydric organic compound selected from the class consisting of polyhydric alcohols and phenols, having at least two phenolic hydroxyl groups, (2) at least 6 parts by weight of organic nitrogen containing base, and (3) from 5 to 40 parts by weight of lactam.

2. A laminated structure comprising laminae coated and impregnated with a composition of matter comprising the heat reaction product of (1) 100 parts by weight of a complex epoxide resin containing 1, 2 epoxide groups and comprising a polyether derivative of a polyhydric organic compound selected from the class consisting of polyhydric alcohols and phenols having at least two phenolic hydroxyl groups, (2) at least 6 parts by weight of organic nitrogen containing base, and (3) from 5 to 40 parts by weight of lactam.

3. An electrical conductor coated with a composition of matter comprising the heat reaction product of (1) 100 parts by weight of a complex epoxide resin containing 1, 2 epoxide groups and comprising a polyether derivative of a polyhydric organic compound selected from the class consisting of polyhydric alcohols and phenols having at least two phenolic hydroxyl groups, (2) at least 6 parts by weight of organic nitrogen containing base and (3) from 5 to 40 parts by weight of lactam.

4. The process of preparing a heat cured epoxy resin composition which comprises combining (1) 100 parts by weight of a complex epoxide resin containing 1, 2 epoxide groups and comprising a polyether derivative of a polyhydric organic compound selected from the class consisting of polyhydric alcohols and phenols having at least two phenolic hydroxyl groups, (2) at least 6 parts by weight of organic nitrogen containing base, and (3) from 5 to 40 parts by weight of lactam.

References Cited in the file of this patent

UNITED STATES PATENTS

| | | |
|---|---|---|
| 2,444,333 | Castan | June 29, 1948 |
| 2,707,708 | Wittcoff | May 3, 1955 |

OTHER REFERENCES

Dunn: "Rubber and Plastics Age" (1954), volume 35, pp. 84–87.

Schildknecht: Polymer Processes, volume X, pp. 239–243 (1956).